June 26, 1956    F. KASTORY    2,751,995
COMBINATION BUMPER AND STEERING CONTROL FOR AUTOMOBILES
Filed Oct. 5, 1953
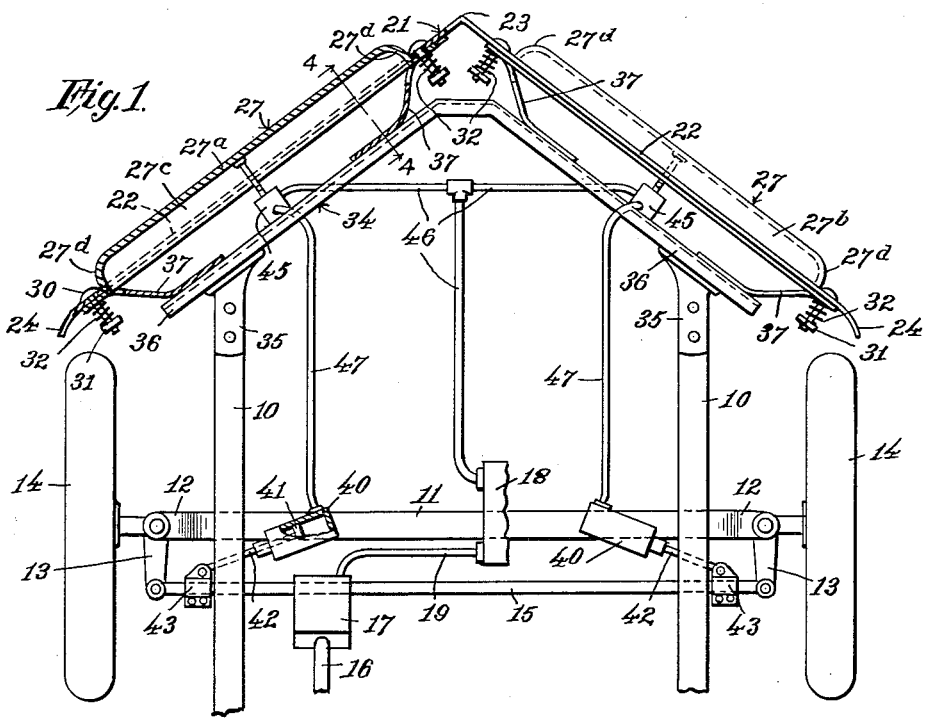
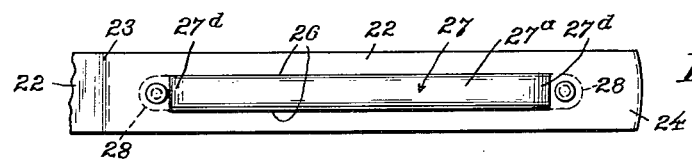
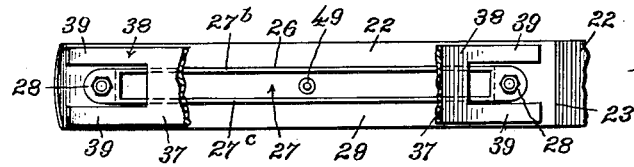
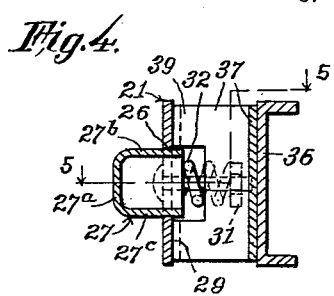
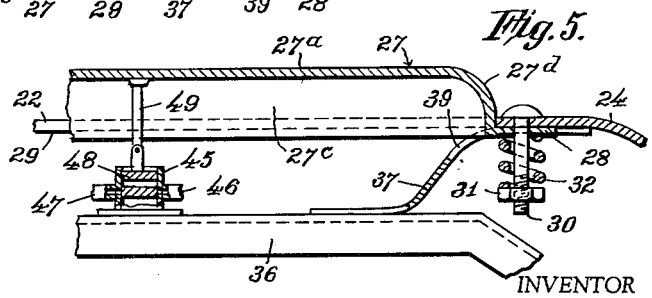
INVENTOR
*Frank Kastory*
BY *Chas. R. Allen*
ATTORNEY

United States Patent Office 2,751,995
Patented June 26, 1956

2,751,995

COMBINATION BUMPER AND STEERING CONTROL FOR AUTOMOBILES

Frank Kastory, Bradenton, Fla.

Application October 5, 1953, Serial No. 384,094

7 Claims. (Cl. 180—83)

This invention relates to safety devices for automobiles; and particularly to a novel bumper and means cooperating therewith to control the direction of movement of the automobile immediately upon impact with an object.

With automobile bumpers of the usual substantially straight transverse type, a person struck thereby will usually be knocked down directly in front of the car in a position to be run over by the wheels before the car can be stopped. Also, when two cars crash head on, the bumpers usually lock, preventing any relative lateral movement to lessen the force of the impact.

The object of the present invention is to provide an automobile with an improved bumper and cooperating steering control whereby upon impact with a person, car or other object, the person or object struck will be moved laterally out of the path of the oncoming wheels, and the steering mechanism of the car will be immediately actuated upon the impact, to turn the car to the opposite side from that in which the object is moved.

A further object of the invention is to provide an automobile bumper with auxiliary means for reducing the impact when striking an obstruction.

A further and particular object of the present invention is to provide a safety device of the type stated, which may be readily attached to an automobile to replace the usual bumper, and operatively connected to the steering mechanism without making any change or alteration of any portion of the car.

Other objects will appear hereinafter.

With the above objects in view the invention consists generally in a car equipped with a fluid pressure system, a V-shaped bumper fixed to said car with the apex thereof extending forwardly in order to move a person or object struck thereby, to one side of the path of the car; fluid pressure actuated means connected to the steering apparatus, and means on said bumper which will be operated upon contact, to connect said fluid pressure actuated means to said fluid pressure system whereby the car will be automatically turned to the opposite direction from that to which the said person or object is moved.

The invention further consists in various details of construction and combination of parts as will be described hereinafter and particularly pointed out in the claims.

The invention will be more readily understood by reference to the accompanying drawings, in which, Fig. 1 is a diagrammatic plan view of the forward portion of the chassis of a car equipped with a bumper and associated steering control embodying the invention; one side of the bumper being illustrated in horizontal section;

Fig. 2 is a front elevation of one side of the bumper viewed at right angles thereto;

Fig. 3 is a rear elevation of the same;

Fig. 4 is a transverse section on the line 4—4 of Fig. 1; and

Fig. 5 is a detail longitudinal section on substantially the line 5—5 of Fig. 4.

Referring to the drawings, 10 indicates the forward portions of the longitudinal side members of an automobile chassis, and 11 the front axle fixed thereto and having the usual forked ends 12 in which the steering knuckles 13 of the wheels 14 are mounted. The knuckles 13 are connected by the usual tie rod 15 which is operatively connected to the steering post 16 in any preferred manner. As the specific form of said mechanism is no part, per se, of the present invention, only the casing 17 for the same is illustrated in Fig. 1 of the drawings. In modern cars, many of the operations thereof, including the steering, are performed or facilitated by the use of fluid pressure; and 18 indicates a reservoir or other source of such fluid pressure, which may be connected, as by a duct 19 to the casing 17, should the steering mechanism be designed to be faciliatated thereby.

The bumper comprises generally a V-shaped structure 21 consisting of two similar side portions or wings 22, 22, which extend symmetrically outwardly and rearwardly from a centrally positioned apex 23; the rear ends 24 of said wings terminating forwardly of the wheels 14. By this arrangement, should the bumper strike an obstruction, such as a person or other movable object, said obstruction will be moved laterally to one side or the other of the car, instead of being knocked down directly in front of the same.

In order to ensure that the wheels of the car shall not pass over the object hit by the bumper, should said object not have been moved laterally entirely beyond the forward path of the wheels, means are provided for automatically steering the car to the opposite side from said object immediately upon the impact of the bumper therewith, as will be described hereinafter.

Each wing 22 of the bumper is provided with a longitudinally disposed slot 26 which preferably extends the greater portion of the length of the respective wings; and in each of said slots 26 is yieldingly mounted a buffer 27 which projects outwardly from the bumper wing, as illustrated, particularly in Figs. 1 and 4. Each buffer comprises an elongated member consisting of an outer longitudinal wall 27a, and preferably straight and parallel upper and lower walls 27b and 27c respectively. The ends of the outer wall 27a are preferably well rounded inwardly forming curved end walls 27d which present no angular portion upon which any part of a person, clothing, or object hit, may be caught or snagged and the upper and lower walls 27b and 27c will prevent any of such parts or objects from being caught between the buffer 27 and the contiguous bumper wing 22. The ends of said buffer 27 are provided with lugs 28 which extend longitudinally beyond the respective ends of the slot 26 and normally engage the inner or rear face 29 of the respective bumper wing 22, and limit the outward movement of the buffer. To yieldingly hold said buffer in forwardly projecting position, guide pins 30 are extended through said lugs 28 and the adjacent portion of the bumper, and adjustable members 31 are threaded or otherwise mounted on the inner portions of said pins, between which members 31 and the lugs 28 are arranged springs 32. It is obvious that the buffer 27 will materially reduce the force of the impact.

To mount the bumper in position on the automobile, a supporting frame 34 is provided, which frame is secured to the chassis as by brackets 35. The frame 34 is substantially V-shaped, as shown in Fig. 1 and comprises generally a pair of bars 36—36 which substantially parallel the wings 22—22 respectively; and preferably resilient brackets 37 connect the bumper to the frame 34. To avoid interference with the inward movement of the buffers 27, the outer ends 38 of the brackets 37 are bifurcated as is illustrated in Fig. 3, forming spaced end portions 39 which are attached to the bumper wings 22.

Mounted adjacent the tie rod 15, upon a fixed portion of the chassis, such as the axle 11, are a pair of cylinders 40, 40 each having a piston 41 connected by means of a rod 42, to one of two brackets 43 respectively fixed to the tie rod 15. The cylinders 40 are so positioned that when fluid pressure is admitted to one of said cylinders, the wheels will be turned to steer the car to the opposite side, and away from the object which has been hit by the bumper. A valve casing 45 is mounted upon each of the frame bars 36 adjacent the longitudinal center of the respective buffer 27, and is connected to the source of fluid pressure 18 as by conduits 46, and to the cylinders 40 as by conduits 47. The valve 48 is connected to the buffer 27 as by a rod 49 or other suitable means, so that upon slight inward movement of the buffer a communication is established between the source of fluid pressure 18 and the respective cylinder 40, thereby actuating the steering device to turn the wheels to the opposite side from the side receiving the impact. The valve 48, as illustrated, is merely conventional as any suitable type of valve may be employed.

The device as above described may be readily attached to substantially any automobile having fluid controlled steering mechanism, and without making any change in, or alteration of any portions or parts of the car, except the connection of the conductor 46 to the fluid pressure reservoir 18. To install the device, the usual bumper and bumper brackets are removed, and the new device substituted therefor; the brackets 35 being adapted to be attached to the forward ends of the chassis members 10 in place of the brackets that have been removed. Brackets 43 are then clamped to the tie rod 15; and the cylinders 40 are mounted upon the axle 11; after which the conductors 46 are connected to the compressed air reservoir 18.

It should also be noted that the supporting frame 34 is rigidly mounted upon the chassis, and that the bumper proper is mounted thereon by the resilient brackets 37, so that there will be no tendency of the device as a whole, or of any portion thereof, to sag or droop out of normal position.

It is believed that the operation of the device will be fully understood from the above description.

I claim:

1. In an autmobile, a chassis including the usual longitudinal side members, and front axle, a pair of front wheels, steering knuckles connecting said wheels to said chassis and a tie rod connecting said knuckles, in combination with a bumper, a supporting frame for said bumper rigidly mounted on the forward ends of said longitudinal side members of said chassis, a pair of longitudinally extending buffers on said bumper, arranged one upon each side of the center thereof, each of said buffers being provided with means for yieldingly holding the same with the outer face thereof positioned forwardly of said bumper throughout the length of said buffers, and means actuated upon inward movement of either of said buffers for turning said wheels to steer the automobile to the side opposite that of said actuating buffer.

2. In an automobile, a chassis, a V-shaped bumper rigidly supported upon the forward ends of said chassis side members comprising a pair of wings extending outwardly and rearwardly from a centrally located apex, a buffer mounted upon each of said wings and extending longitudinally thereof, independent means for yieldingly holding each of said buffers with the outer faces thereof projected forwardly of the respective wings throughout the length of said buffers, and means actuated upon inward movement of either of said buffers to steer the automobile to the opposite side from said inwardly moved buffer.

3. In an automobile, a chassis, a V-shaped bumper comprising a pair of wings extending outwardly and rearwardly from a central apex, a supporting frame for said bumper mounted upon said chassis and comprising a pair of angularly disposed bars parallel with said wings respectively, brackets connecting said wings in spaced relation to said bars, a buffer extending longitudinally of each of said wings, means yieldingly holding each of said buffers with the outer faces thereof forwardly of said wings respectively throughout the length of said buffers, a source of fluid pressure, a valve on each of said angularly disposed bars, ducts connecting said valves to said source of fluid pressure, means on each of said buffers for actuating the valve contiguous thereto, and means controlled from said valves respectively for changing the direction of movement of said automobile.

4. In an automobile, a chassis, a pair of front wheels, steering knuckles connecting said wheels to said chassis, a tie rod connecting said knuckles, in combination with a pair of cylinders mounted upon said chassis, each of said cylinders having a piston and a piston rod connected at the outer end thereof to said tie rod, a V-shaped bumper supported at the forward end of said chassis and comprising a pair of wings extending outwardly and rearwardly from a central apex, a buffer yieldingly mounted on each of said wings and projecting forwardly therefrom, a source of fluid pressure supply, ducts connecting said source of fluid pressure supply to said cylinders, valves interposed in said ducts, and means connecting said buffers to said valves respectively, whereby inward movement of either of said buffers will open the duct to the respective cylinder, as and for the purpose described.

5. In an automobile, a chassis, a pair of front wheels, steering knuckles connecting said wheels to said chassis, and a tie rod connecting said knuckles, in combination with a pair of cylinders mounted on said chassis adjacent said knuckles respectively, each of said cylinders having a piston and a piston rod extending therefrom laterally of said chassis and connected to said tie rod, a V-shaped bumper comprising a pair of wings extending outwardly and rearwardly from a central apex, a supporting frame for said bumper fixed to said chassis and comprising a pair of bars parallel with said wings respectively, brackets connecting said bars and said wings in spaced relation, a buffer extending longitudinally of each of said wings, means yieldingly holding said buffers with the outer faces thereof forward of the respective wings, a source of fluid pressure supply, ducts extending from said source to said cylinders respectively, a valve mounted on each of said frame bars and interposed in the ducts to said cylinders respectively, and means connecting each of said buffers to the respective valve whereby inward movement of a buffer will open the duct to the respective cylinder to change the direction of the automobile.

6. In an automobile, a chassis, a pair of front wheels, steering knuckles connecting said wheels to said chassis, and a tie rod connecting said knuckles, in combination with a V-shaped bumper comprising a pair of wings extending outwardly and rearwardly from a central apex, a supporting frame for said bumper fixed to said chassis, brackets connecting said wings and said supporting frame, each of said wings provided with a longitudinal slot extending from adjacent the apex to adjacent the rear end thereof, a buffer mounted in each of said slots, a lug on each end of said buffer and normally engaging the inner face of the respective wing, resilient means holding said lugs in yielding engagement with said inner face, with the remainder of said buffer projecting forwardly of said wings throughout the length of said slot, and means operable upon inward movement of either of said buffers, to change the direction of said automobile.

7. A device as set forth in claim 6, in which each of said buffers comprises an outer front wall, a top wall, a bottom wall, and a pair of end walls, said end walls being well rounded.

References Cited in the file of this patent

UNITED STATES PATENTS

| | | |
|---|---|---|
| 1,132,117 | Pokorny | Mar. 16, 1915 |
| 1,569,502 | Kurtis | Jan. 12, 1926 |